Sept. 7, 1926.
W. J. BAZAREK
1,599,159
SHOCK ABSORBER
Filed Sept. 28, 1925
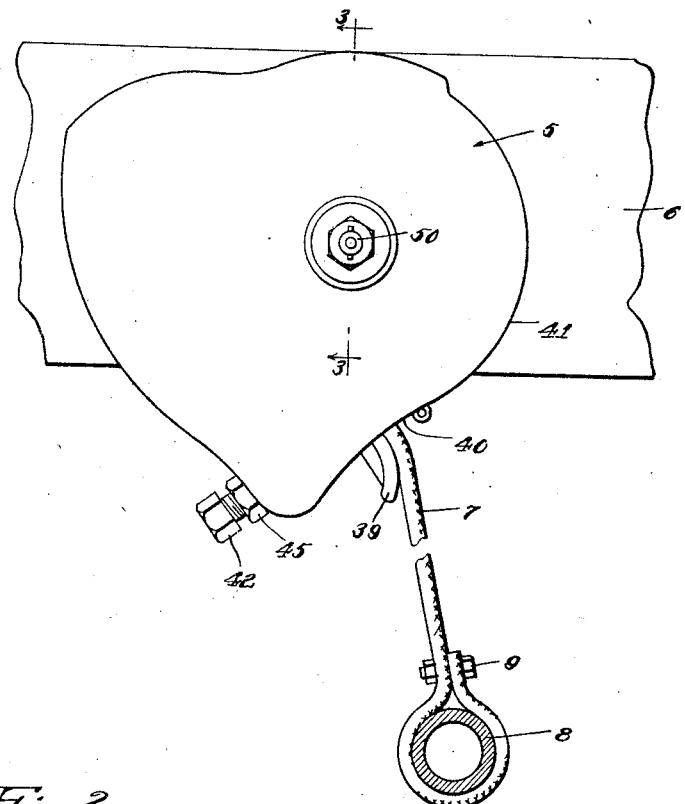
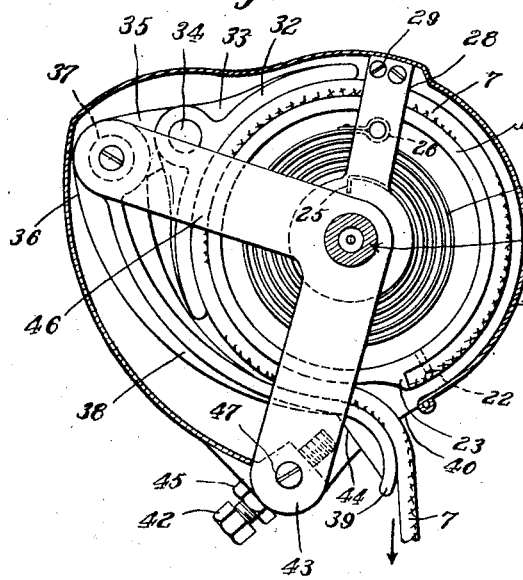
Inventor
Waldo J. Bazarek
By Wilson & McCanna
Attys.

Patented Sept. 7, 1926.

1,599,159

UNITED STATES PATENT OFFICE.

WALDO J. BAZAREK, OF BELVIDERE, ILLINOIS, ASSIGNOR OF ONE-FOURTH TO CHARLES GRITZBAUGH AND ONE-FOURTH TO DELL DANIELS, OF BELVIDERE, ILLINOIS.

SHOCK ABSORBER.

Application filed September 28, 1925. Serial No. 59,043.

This invention relates to shock absorbers for motor vehicles.

One of the principal objects of the invention is to provide a shock absorber which is more positive in operation than previously available types by virtue of the fact that it does not rely for its checking or snubbing action on the mere friction arising in the movement of the tape or the resistance due to the winding up of a retrieving spring during the rebounding movement of the vehicle, but has a positively operating braking mechanism to set up a definite and effective retarding force to check or snub the rebounds of the vehicle.

A further object is to provide a shock absorber of the character referred to which is designed to deliver a checking or snubbing force which is always more nearly in proportion to the extent and suddenness of the rebound of the vehicle than was the case in previous types of shock absorbers.

A still further object is to provide a simple and improved form of adjustment for definitely predetermining as desired the available snubbing or checking effect to accommodate the device for use with cars of different weight.

Another object is to provide a shock absorber of a simpler, more durable and economical construction.

These and other objects of the invention will be brought out more clearly as the following specification progresses. Reference will be made to the accompanying drawing illustrating the invention wherein—

Fig. 1 is a side view of a shock absorber embodying the features of my invention, shown mounted on a portion of the chassis of a motor vehicle and connected with the axle or axle housing or other relatively movable part of the vehicle;

Fig. 2 is a similar view of the device with the cover plate broken away to reveal the internal construction; and Fig. 3 is a transverse, vertical section taken on the line 3—3 of Fig. 1 looking in the direction of the arrows.

The shock absorber, designated generally by the reference numeral 5 is supported on the inner or outer side of the chassis frame 6, or some other part moving with the chassis. A flexible tape, cable or web 7 extends from the shock absorber for connection at its free end with the axle or axle housing 8 or with the vehicle supporting springs. Any suitable means, such as the bolts 9, may be provided for permanently connecting the tape to the axle. The operation of shock absorbers, snubbers, and similar retarding or checking devices used on motor vehicles has become quite generally known and it will, therefore, suffice to state that, in the deflection of the vehicle springs caused by the wheels passing over a rough place in the road, the chassis 6 moves freely toward the axle 8 but in the rebound the shock absorber 5 is relied upon to check or retard the recoil or rebound action of the vehicle springs.

The shock absorber comprises a back plate or other suitable support 10 preferably cast to provide a ledge or shoulder 11 arranged to abut against the under side of the channel iron frame members 6 to position the shock absorber and prohibit its turning with respect to the frame in operation despite the fact that only one fastening bolt 12 is intended to be provided. The bolt 12 provides a bearing at 13 for a drum or pulley 14 and has a reduced threaded portion 15 extending through an opening 16 in the plate 10 and through an opening 17 made in the channel iron frame member 6. A nut 18 is threaded on the reduced portion 15 of the bolt 12 and is received in a depression 19 provided by a hollow boss on the plate 10, in order to lie flush with the outer face of the plate 10 while serving to maintain the bolt 12 and parts assembled thereon in proper assembled relation in the device. The remainder of the reduced portion 15 of the bolt 12 may be provided of a suitable length to accommodate different conditions on different cars and enable the use of a fastening nut 20 on the end of the bolt left projecting beyond the channel iron frame member 6. The drum 14 provides a broad, flat bearing surface 21 for the tape 7 which is fastened at its inner end suitably by means of screws 22 which are counter-sunk so as to leave no projections to interfere with the smooth operation of the device. A cam projection or lug 23 is provided on the drum 14 at the inner end of the tape 7 so as to leave no square projection off the periphery of the drum to get caught in the recoil movements of the drum. The coiled torsion spring 24 has its inner end bent at right angles, as indicated at 25, to engage in a slot provided therefor in the hub of the drum 14. The outer end of the spring 24 is bent in a loop, as shown at 26, to receive a pin 27 rigid with the arm 28. The arm 28 is fastened at its outer end by screws 29 to an upstanding lug 30 formed integral with the plate 10. The inner end of the arm 28 is received on the plain, reduced portion 31 of the bolt 12. From the description thus far, it will be seen that the drum 14 is normally impelled to wind up the tape 7 under the action of the spring 24. In this way, the moment a deflection of the vehicle springs occurs, the slack in the tape is taken up and the tape is placed under tension at the limit of the deflection movement when the chassis and axle commence to move apart on the rebound. The tension of the spring 24 may be adjusted as desired by rotating the arm 28 about the bolt 12 as a center and fastening the same by means of the screws 29 in its adjusted position.

The unwinding of the tape 7 occurs during the recoil or rebound movement of the vehicle and is arranged to be checked or retarded by the braking action of a shoe 32. This shoe, as illustrated, is of ample length and curved to fit about a substantial portion of one side of the drum 14 with the tape 7 between the shoe and the drum. The shoe 32 is preferably cast with strengthening ribs 33 on the reverse side thereof and is pivoted, as shown at 34, on the outer end of a short arm 35 of a bell crank lever 36. The lever 36 is pivoted at 37 on a stud projecting from the plate 10 and has a long lever arm 38 extending back of the shoe 32 along the tape 7 with its outer end 39 formed in a sweeping curve where it rides in contact with the tape 7 as the tape extends from the shock absorber through an opening 40 provided in the cover 41. Although the rewinding of the tape 7 on the drum 14 is attended with no appreciable drag or braking action by the shoe 32, the latter, however, is pressed into tight frictional contact with the tape 7 the moment the tape 7 is placed under tension in the rebound of the vehicle. This braking action results from the deflection of the arm 38 in a clockwise direction about the stud 37 as a center, as viewed in Fig. 2, when a pull is communicated to the tape in the direction of the arrow appearing adjacent the broken off end of the tape. The shoe 32 is forced into wedging engagement with the tape 7 as its pivot 34 is moved toward alignment with the centers 12 and 37 in the deflection of the arm 38. Obviously, the checking or snubbing action resulting is substantially in proportion to the extent and suddenness of the rebound, since the greater the pull on the tape becomes, the tighter will be the wedging action of the shoe 32.

I provide for the application of the device to cars of different weight by the provision of an adjustable stop for limiting the possible deflection of the arm 38 and thereby limiting the extent to which the shoe 32 may be moved into wedging engagement with the tape 7. This means is afforded by a set screw 42 threadingly received in a boss 43 projecting from the plate 10. The inner end of the screw 42, by coming into engagement with the flat face 44 provided on the back of the arm 38, limits the deflection of the arm. A lock nut 45 is preferably provided to secure the screw 42 in its adjusted position. It is possible also by the adjustment of the screw 42 to compensate for any wearing of the tape in service. In that case, the screw may be backed a half or full turn, as the occasion demands, to permit a correspondingly greater deflection of the arm 38 and thus secure approximately the same snubbing action as when the tape was new.

A V-shaped plate 46 fits over the reduced outer end 31 of the bolt 12 and has one arm received at its outer end by the stud 37 and the outer end of the other arm fastened, as by means of a screw 47, on top of the boss 43 to brace the stud 37 and the boss 43 from the bolt 12. A nut 48 threaded on the outer end of the reduced portion 31 of the bolt 12 holds the plate 36, with the arm 28, in place. The cover 41 is embossed, as shown at 49, to fit over the nut 48 and is provided with an opening for the reception of a lubricant nipple 50 which threads in an internally threaded socket provided therefor in the outer end of the bolt 12. This socket leads by way of a duct 51 to an intermediate point of the bearing 13 to lubricate the hub of the drum 14 to facilitate the easy rotation of the drum in operation. The nipple 50, at the same time, serves to hold the cover plate 41 in assembled relation on the shock absorber.

I claim:

1. In a shock absorber, a revoluble drum mounted on one of two relatively movable members, a flexible element affixed to and winding on said drum and affixed at its free end to the other member, spring means normally turning said drum in one direction to take up slack in said flexible element, a brake shoe, and means actuated by said flexible element for moving said shoe toward said drum to brake the movement thereof in the unwinding of said flexible element.

2. In a shock absorber, a revoluble drum mounted on one of two relatively movable members, a flexible element affixed to and winding on said drum and affixed at its free end to the other member, spring means normally turning said drum in one direction to take up slack in said flexible element, a brake shoe, and a lever for moving the same, said lever having operative relation with said flexible element to be operated when the latter is placed under tension in unwinding whereby said shoe is moved toward said drum to brake the movement thereof.

3. In a shock absorber, a revoluble drum mounted on one of two relatively movable members, a flexible element affixed to and winding on said drum and affixed at its free end to the other member, spring means normally turning said drum in one direction to take up slack in said flexible element, and a lever having a part movable toward the drum for braking the movement of said drum normally allowing free turning thereof but arranged upon the tensioning of said flexible element to be operated to brake the movement of said drum.

4. In a shock absorber, a revoluble drum mounted on one of two relatively movable members, a flexible element affixed to and winding on said drum and extending therefrom for connection with the other member at its free end, spring means normally turning said drum in one direction to take up slack in said flexible element, a brake shoe arranged for operation on said flexible element to apply pressure thereon against said drum, and means actuated by said flexible element for operating said shoe in the unwinding of said flexible element.

5. In a shock absorber, a revoluble drum mounted on one of two relatively movable members, a flexible element winding about said drum and affixed thereto and affixed at its free end to the other member, spring means normally turning said drum in one direction to take up slack in said flexible element, a fixed abutment adjacent said drum and in spaced relation thereto, and a wedging braking member operating between said fixed abutment and said drum to be operated toward the drum for braking the movement of the latter in the unwinding of said flexible element.

6. In a shock absorber, a revoluble drum mounted on one of two relatively movable members, a flexible element winding about said drum and affixed thereto and affixed at its free end to the other member, spring means normally turning said drum in one direction to take up slack in said flexible element, a fixed abutment adjacent said drum and in spaced relation thereto, a wedging, braking member operating between said fixed abutment and said drum for braking the movement of the latter in the unwinding of said flexible element, and means for bracing said fixed abutment and the bearing for said drum from one another to maintain a fixed spaced relation thereof.

7. In a shock absorber, a revoluble drum mounted on one of two relatively movable members, a flexible element winding about said drum and affixed thereto and affixed at its free end to the other member, spring means normally turning said drum in one direction to take up slack in said flexible element, a fixed abutment adjacent said drum and in spaced relation thereto, a wedging, braking member operating between said fixed abutment and said drum to be operated toward the drum for braking the movement of the latter in the unwinding of said flexible element, and means for limiting the movement of said wedging, braking element in an operative direction.

8. In a shock absorber, a revoluble drum mounted on one of two relatively movable members, a flexible element affixed to and winding on said drum and affixed at its free end to the other member, spring means normally turning said drum in one direction to take up slack in said flexible element, a brake shoe, a lever for moving the same, said lever having operative relation with said flexible element to be operated when the latter is placed under tension in unwinding whereby said shoe is moved toward said drum to brake the movement thereof, and means for limiting the movement of said lever in an operative direction.

9. In a shock absorber, the combination of a support arranged to be carried on one of two relatively movable members, a flexible tape extending therefrom for connection with the other relatively movable member, a take-up spring for said tape, means providing a tape-bearing surface, and a lever member adjacent said surface of a bell crank form having a short inner end extending toward and adjacent said surface for applying braking pressure, said lever having a longer outer end extending from said surface alongside said tape and having a part in engagement therewith at its outer end to be operated thereby when said tape is placed under tension in the rebounding movements of said members whereby to exert a pressure-increasing leverage to secure heavy braking effect at the inner end of said lever.

10. In a shock absorber, the combination of a support arranged to be carried on one of two relatively movable members, a flexible tape extending therefrom for connection with the other relatively movable member, a take-up spring for said tape, means providing a tape-bearing surface, a lever member adjacent said surface of a bell crank form having a short inner end extending toward and adjacent said surface for applying braking pressure, said lever having a longer outer end extending from said surface alongside said tape and having a part in engagement therewith at its outer end to be operated thereby when said tape is placed under tension in the rebounding movements of said members whereby to exert a pressure-increasing leverage to secure heavy braking effect at the inner end of said lever, and a shoe pivotally mounted on the inner end of said lever for movement toward said tape-bearing surface.

11. In a shock absorber, the combination of a support arranged to be carried on one of two relatively movable members, a drum rotatably mounted on said support, a flexible tape winding on and affixed to said drum and extending therefrom for connection with the other relatively movable member, a take-up spring normally turning said drum to take up slack in said tape, a brake shoe of a substantial length and curved to embrace a substantial portion of one side of said drum about the tape thereon, and a bell crank lever pivoted on a fixed abutment adjacent said drum having a short inner end pivotally connected with said shoe and having a long outwardly extending end having engagement at its outer end with said tape to be operated by said tape when it is placed under tension in the rebounding movements of said members.

12. In a shock absorber, the combination of a support arranged to be carried on one of two relatively movable members, a drum rotatably mounted on said support, a flexible tape winding on and affixed to said drum and extending therefrom for connection with the other relatively movable member, a take-up spring normally turning said drum to take up slack in said tape, a brake shoe of a substantial length and curved to embrace a substantial portion of one side of said drum about the tape thereon, a bell crank lever pivoted on a fixed abutment adjacent said drum having a short inner end pivotally connected with said shoe and having a long outwardly extending end having engagement at its outer end with said tape to be operated by said tape when it is placed under tension in the rebounding movements of said members, and an adjustable set screw adjacent the outer end of said lever in a fixed abutment arranged adjacent thereto to adjust the extent of possible deflection of said lever under the action of said tape.

13. In a shock absorber, the combination of a support to be carried on one of two relatively movable members, a drum rotatably mounted on said support, a flexible tape winding on and affixed to said drum and extending for connection at its free end with the other relatively movable member, a retriever spring for said drum, and a lever pivotally mounted on a center adjacent and in fixed, spaced relation to said drum having its outer end in engagement with said tape to deflect said lever when said tape is placed under tension in the rebounding movements of said members, the inner end of said lever being moved in the deflection thereof toward alignment with the centers about which said drum and lever operate whereby to produce a wedging, braking action.

14. In a shock absorber, the combination of a support to be carried on one of two relatively movable members, a drum rotatably mounted on said support, a flexible tape winding on and affixed to said drum and extending for connection at the free end with the other relatively movable member, a retriever spring for said drum, a lever pivotally mounted on a center adjacent and in fixed, spaced relation to said drum having its outer end in engagement with said tape to deflect said lever when said tape is placed under tension in the rebounding movements of said members, the inner end of said lever being moved in the deflection thereof toward alignment with the centers about which said drum and lever operate whereby to produce a wedging, braking action, and means for adjustably limiting the deflection of said lever to take care of different weights of cars by varying the snubbing effect.

15. In a shock absorber, the combination of a support to be carried on one of two relatively movable members, a tape extending therefrom for connection with the other relatively movable member, a take-up spring on said support for said tape, means adjacent said tape providing a bearing surface therefor, a lever pivotally mounted on a center adjacent said surface fixed in spaced relation thereto, said lever having one end engaged by said tape to be operated in a braking movement when said tape is placed under tension in the rebounding movements of said members, the other end of said lever constituting the braking end and being movable in the braking movement in the same direction with said tape between said surface and the pivot point of said lever for wedging, braking operation, and a brake shoe pivotally mounted on the last-mentioned end of said lever.

16. In a shock absorber, a frame, a revoluble drum mounted thereon on one of two relatively movable members, a flexible element winding about said drum and affixed thereto and affixed at its free end to the other member, spring means normally turning said drum in one direction to take up slack in said flexible element, a fixed abutment provided on said frame adjacent said drum and in spaced relation thereto, a wedging braking member operating between said fixed abutment and said drum for braking the movement of the latter in the unwinding of said flexible element, means extending between the bearing for said drum and said fixed abutment for bracing the bearing and abutment in a fixed spaced relation, said braking member having a part extending about said drum arranged to be oscillated by said tape in the tensioning of the latter, a second fixed abutment provided on said frame adjacent said part and providing a stop for limiting the movement of said part, and means extending between said last mentioned abutment and the bearing for said drum for maintaining a fixed spaced relation therebetween.

In witness of the foregoing I affix my signature.

WALDO J. BAZAREK.